(No Model.) 6 Sheets—Sheet 1.

E. THEISEN.
CORRUGATED CONDENSER PLATE.

No. 441,781. Patented Dec. 2, 1890.

(No Model.) 6 Sheets—Sheet 2.
E. THEISEN.
CORRUGATED CONDENSER PLATE.
No. 441,781. Patented Dec. 2, 1890.
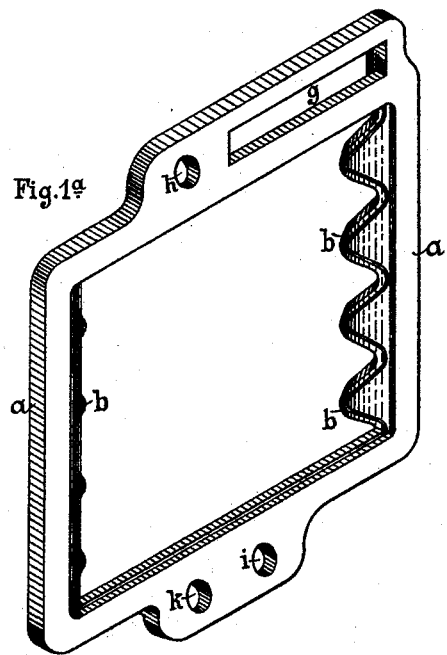
Fig. 1ª
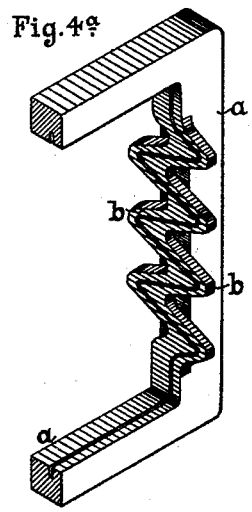
Fig. 4ª
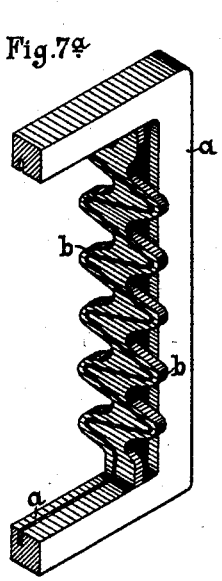
Fig. 7ª
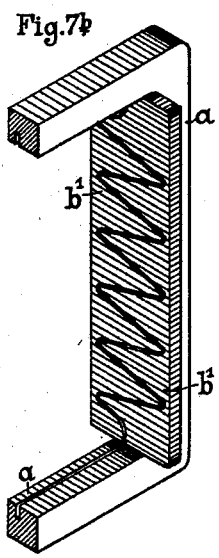
Fig. 7ᵇ
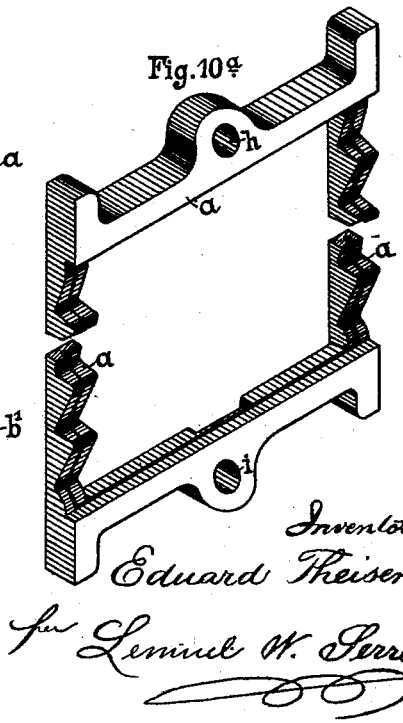
Fig. 10ª
Witnesses
Chas. H. Smith
J. Haib
Inventor
Eduard Theisen
per Lemuel W. Serrell
atty

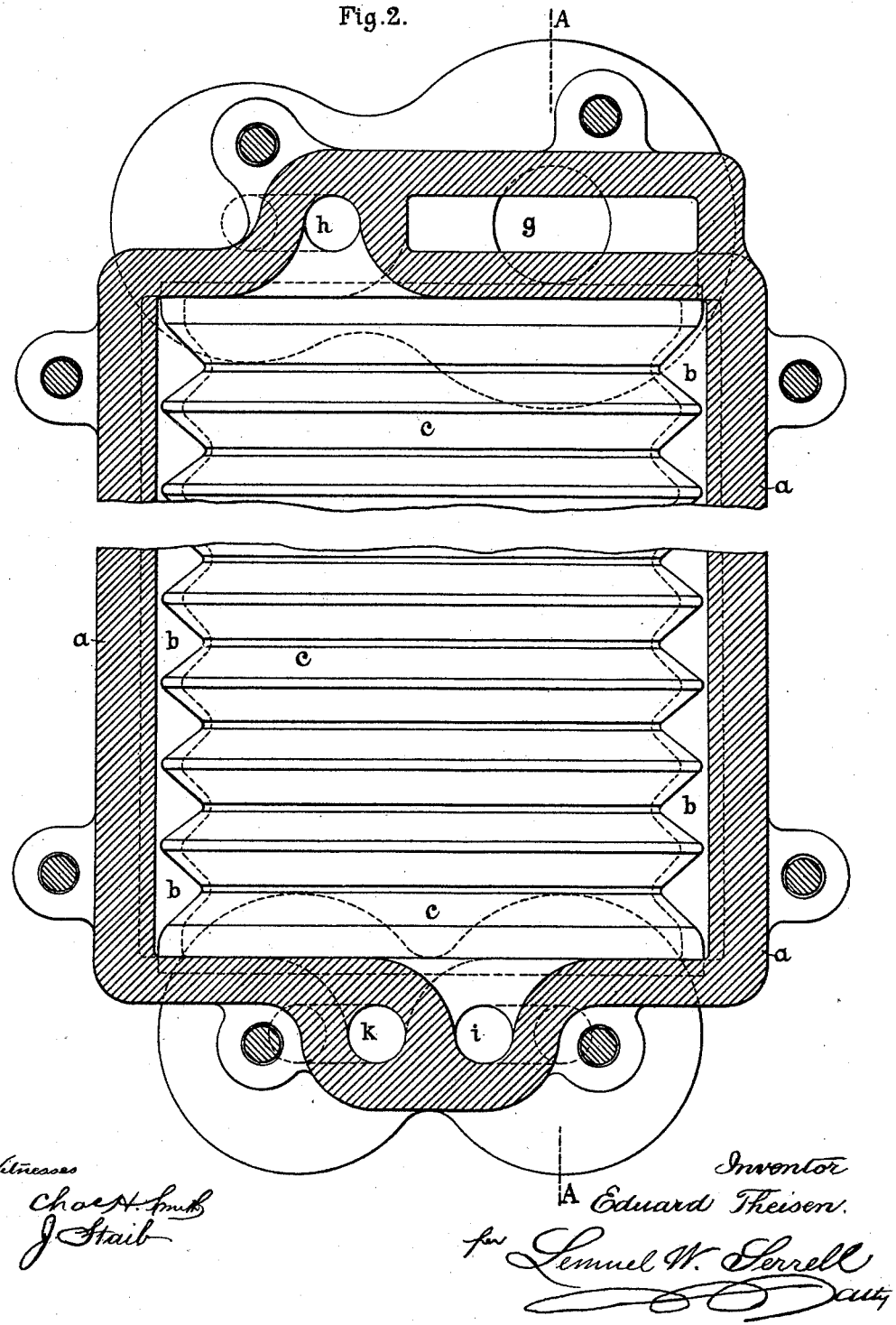

(No Model.) 6 Sheets—Sheet 4.

E. THEISEN.
CORRUGATED CONDENSER PLATE.

No. 441,781. Patented Dec. 2, 1890.

Witnesses
Chas H. Smith
J. Staib

Inventor
Eduard Theisen.
per Lemuel W. Serrell
Atty (No Model.) 6 Sheets—Sheet 5.

E. THEISEN.
CORRUGATED CONDENSER PLATE.

No. 441,781. Patented Dec. 2, 1890.

Witnesses:
Chas. F. Smith
J. Hait

Inventor
Eduard Theisen
per Lemuel W. Serrell
atty.

(No Model.) 6 Sheets—Sheet 6.

E. THEISEN.
CORRUGATED CONDENSER PLATE.

No. 441,781. Patented Dec. 2, 1890.

Witnesses
Chas H. Smith
J. Stait

Inventor
Eduard Theisen
for Lemuel W. Serrell

UNITED STATES PATENT OFFICE.

EDUARD THEISEN, OF COLOGNE, GERMANY.

CORRUGATED CONDENSER-PLATE.

SPECIFICATION forming part of Letters Patent No. 441,781, dated December 2, 1890.

Application filed September 29, 1887. Serial No. 250,999. (No model.)

*To all whom it may concern:*

Be it known that I, EDUARD THEISEN, of Cologne, in the Kingdom of Prussia, Germany, have invented an Improvement in Corrugated Condenser-Plates, of which the following is a specification.

Corrugated sheet-metal plates have been made use of in condensing and cooling apparatus; but difficulty has been experienced in securing these plates at the edges, so as to be steam and water tight, and at the same time in bringing these corrugated plates to the desired proximity for producing narrow chambers for containing the steam and water or other fluid.

In my present improvements the edges of the corrugated plates are secured to metallic frames, and these frames lie one upon the other and are fastened together, thereby forming chambers that are bounded by the corrugated plates and the frames, and such chambers are sufficiently narrow for the passage of the fluid in a comparatively thin layer, and the chambers open into supply and discharge pipes, so that steam may be introduced into alternate chambers for the purpose of condensing such steam, or liquids introduced into the alternate chambers may be warmed or heated, the apparatus being adapted to either the heating or cooling operation.

Figure 1:
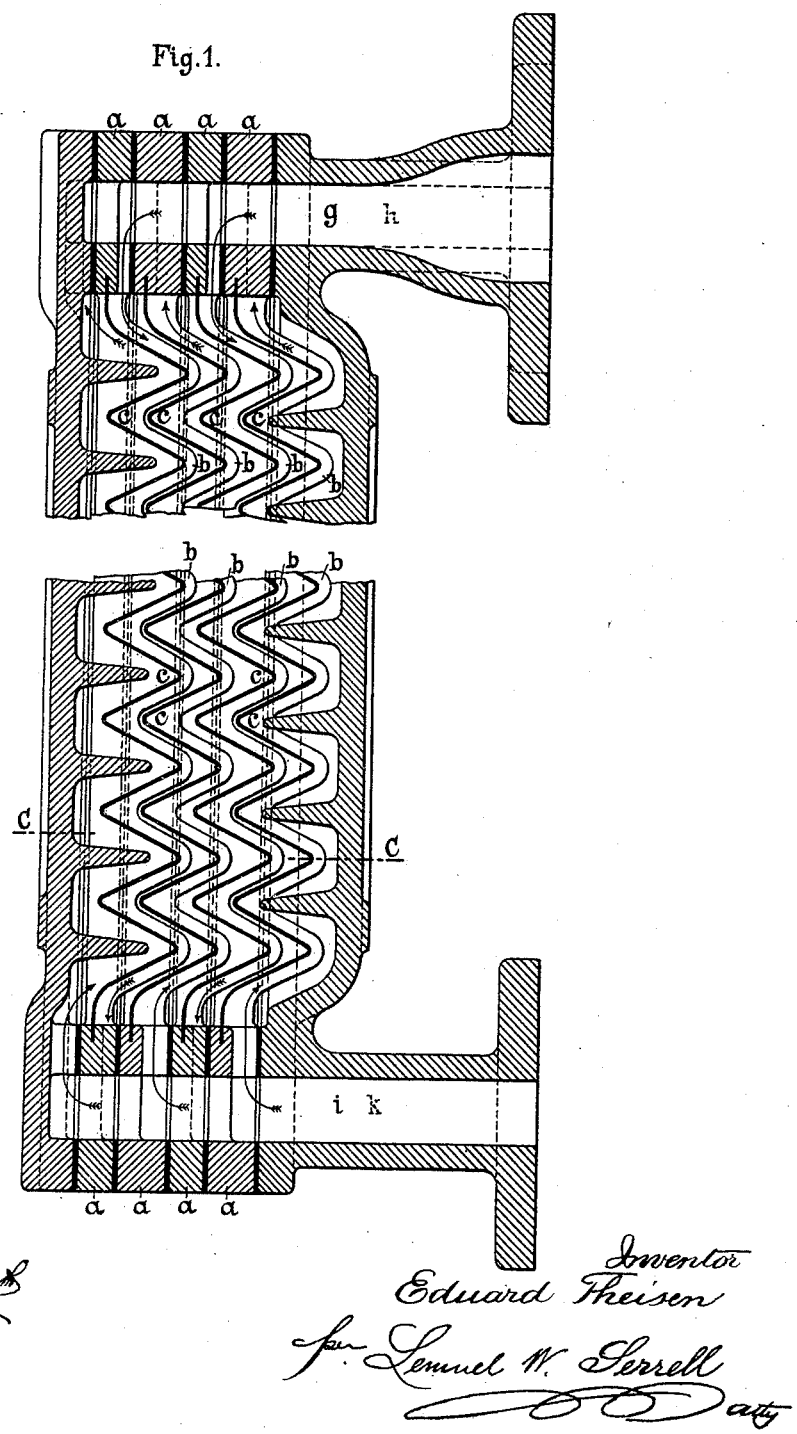
Figure 3:
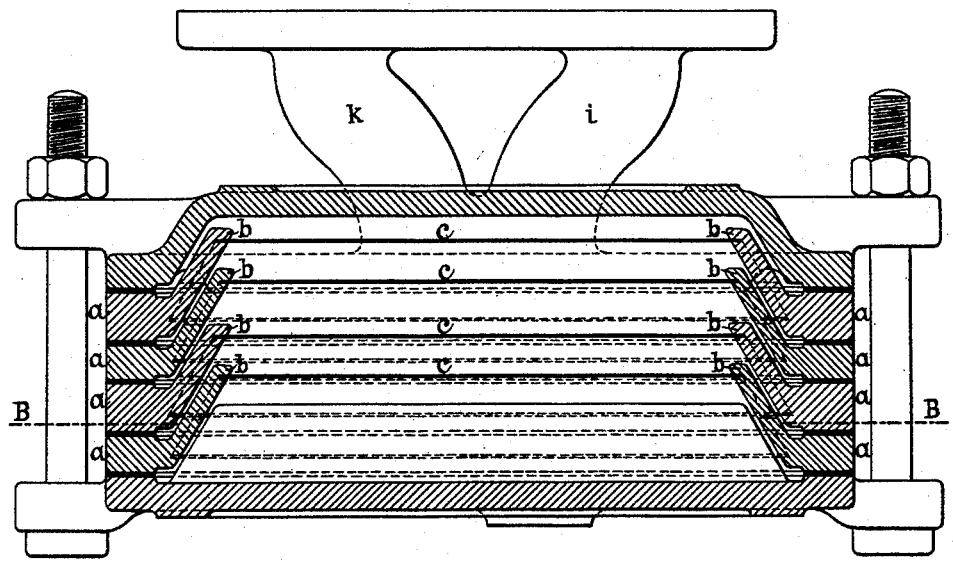
Figure 4:
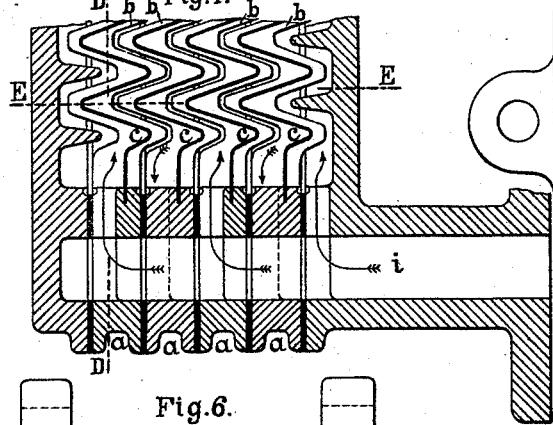
Figure 5:
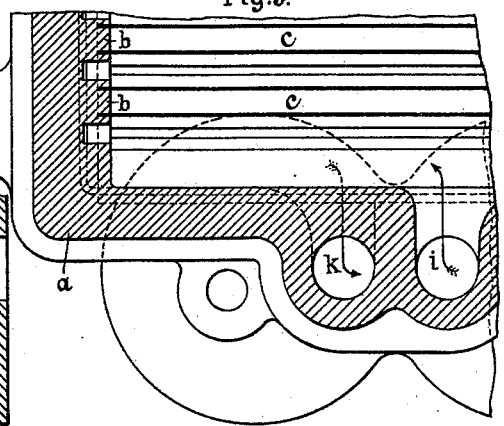
Figure 6:
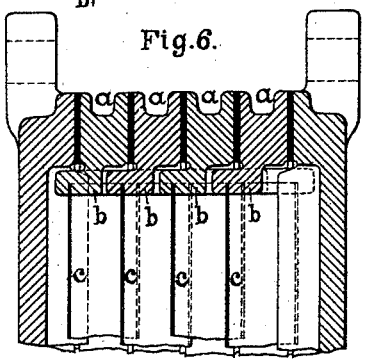
Figure 7:
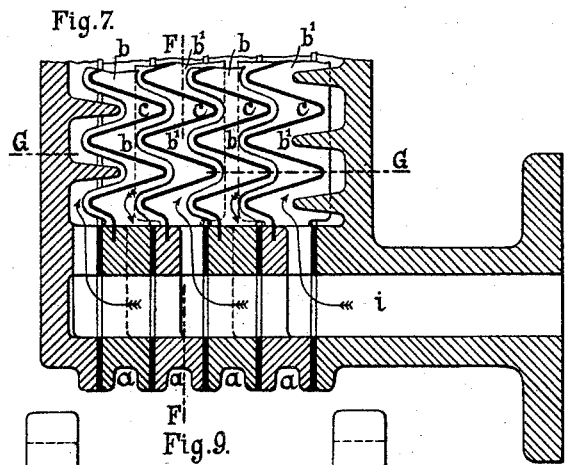
Figure 9:
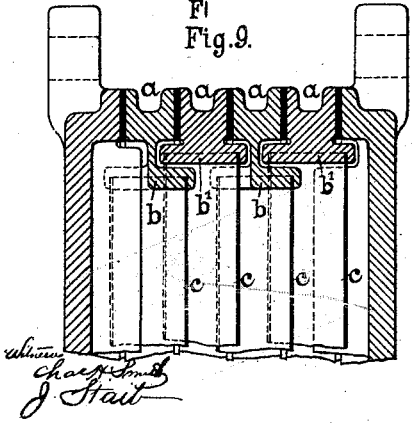
Figure 8:
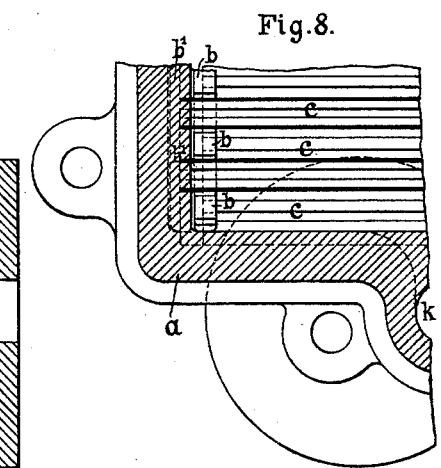
Figure 10:
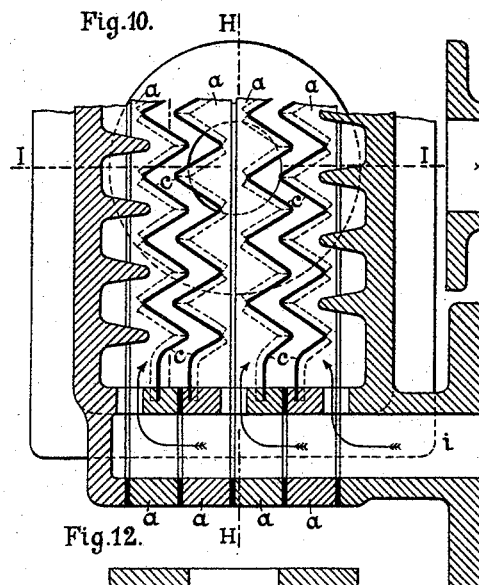
Figure 11:
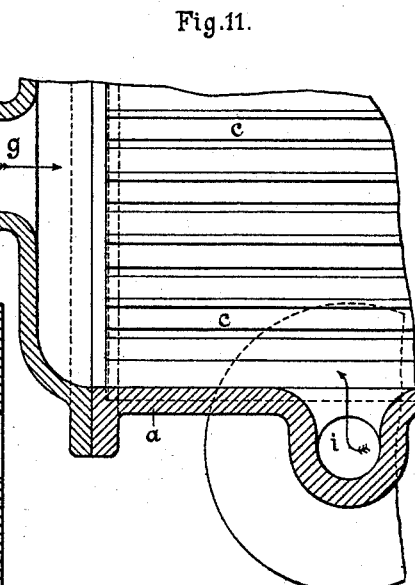
Figure 12:
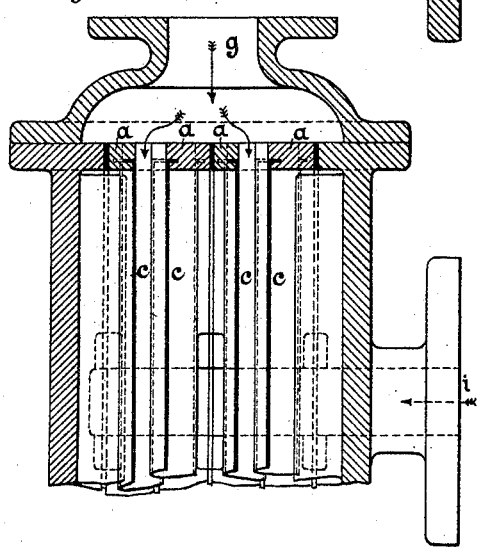

In the drawings, Figure 1 is a section longitudinally of the apparatus at the line A A, Fig. 2, and through the corrugated plates and the frames. Fig. 2 is a plan view partially in section at the line B B, Fig. 3, showing the frame and corrugated plate. Fig. 3 is a cross-section at the line C C, Fig. 1. Fig. 4 is a partial section similar to Fig. 1, showing a modification in the construction of the parts. Fig. 5 is a partial sectional plan, and Fig. 6 is a partial sectional elevation at the line E E, Fig. 4. Fig. 7 is a partial sectional elevation similar to Fig. 1, representing a further modification in the details of construction. Fig. 8 is a partial sectional plan, and Fig. 9 a partial sectional elevation at the line G G, of the devices similar to those shown in Fig. 1. Fig. 10 is a partial section similar to Fig. 1 of a modification of the apparatus. Fig. 11 is a partial sectional plan, and Fig. 12 a partial sectional elevation at the line I I, Fig. 10. Fig. 1$^a$ is a perspective view of one of the frames. Fig. 4$^a$ is a partial perspective view of the frame corresponding to that shown in Fig. 4. Fig. 7$^a$ is a partial perspective view of one of the frames shown in Figs. 7 and 9, and Fig. 7$^b$ is a similar view of the other frame, and Fig. 10$^a$ is a perspective view illustrating the manner in which the frames are constructed for the apparatus shown in Figs. 10, 11, and 12.

The corrugated sheets are indicated in the respective figures at $c$ $c$, and these corrugations extend across the sheet, the ends of the sheet being flat. The respective frames $a$ are quadrangular and of a proper size for the reception of the sheets, and at the ends of the frames the flat portions of the metallic sheets either pass in between one frame and the next or else they are received into grooves or channels along the straight end portions of the frames, as seen in the perspective views, the latter being preferable, and these straight edges are either soldered, riveted, or otherwise secured in any convenient manner.

The sides of the metal frames $a$ are adapted to receive the corrugated edges of the metallic sheets, and for this purpose such frames are made with flanges that are grooved or channeled for the reception of the corrugated edges.

I have represented some of the different ways in which the inner edges of the frames at the sides can be widened for the reception of the corrugated edges of the metallic sheets. In Figs. 1 and 1$^a$ the frames are widened by inclined flanges, (more clearly seen in Fig. 3,) which flanges extend only toward one side of each of the frames; but in Figs. 4$^a$ and 7$^a$ the flanges are represented as extending both above and below the metal frames, the edges of said flanges being corrugated or zigzag to correspond, or nearly so, with the channels into which the edges of the sheets are received. These flanges $b$ are at right angles to the planes of the respective frames, and such flanges are set one into the other, as illustrated in Fig. 6, and are all in line; but in place of these zigzag flanges setting into each other there may be straight flanges $b'$, such as represented in Figs. 7$^b$ and 9, for receiving the edges of alternate sheets, and flanges $b$ with zigzag edges, such as shown in Fig. 7$^a$, that project farther inward upon the respective alternating frames, so as to set inside of the flanges $b'$, as represented in Fig. 9. In all instances the zigzag edges of the sheets are received into grooves or channels in the flanges upon the inside edges of the respective frames $a$, and these frames are placed or piled one upon another to the desired number, so as to form a series of chambers separated by the corrugated plates and surrounded by the frames.

By this improvement the corrugated plates are strongly supported all around their edges, and the chambers formed between the plates are sufficiently thin for a large number to occupy but a comparatively small space.

It is to be understood that the alternate chambers are connected to a common source of supply and discharge. I have shown the tubular openings $g$ in the respective frames as provided with lateral openings into the respective chambers for the supply of one of the fluids and the lateral openings to the tubular discharge $k$ and with the tubular and lateral openings $i$ for the supply of fluid to the alternate chambers and the lateral and tubular openings $h$ for the discharge or escape of such fluid.

When this apparatus is used as a condenser, the vapors pass into the alternate chambers by the lateral openings from the pipe $g$, and the condensed liquid runs off by the pipe $k$, and the cooling-water is supplied through $i$ and passes off by $h$. If a liquid or fluid is to be heated the operations are similar, the apparatus being adapted to the transfer of heat from one fluid or liquid to another.

Cement or other suitable packing material is to be placed between the respective frames $a\ a$, and the whole series of frames are pressed together by suitable cross bars and bolts, as seen in Fig. 3.

In Figs. 10 and 11 the entrance-pipe $g$ for one fluid is shown as adjacent to the corrugated edges of the sheets and the pipe $i$ as at the ends of the sheets.

The two outside plates of the apparatus are represented as of cast metal with corrugations or ribs on their inner surfaces corresponding to the corrugations of the sheet metal.

I am aware that condensers have been made of corrugated plates placed together to form chambers between them. In my improvement the borders of the corrugated plates are permanently fastened steam-tight to the surrounding rigid frames, so that it is only necessary to place any desired number of such frames and plates together to form the cooler or condenser and to make the joints between the rigid frames steam-tight.

I claim as my invention—

1. The corrugated plates, in combination with the surrounding frames that receive and hold the edges of the corrugated plates, such frames being provided with internal flanges for receiving the corrugated edges of the plates, substantially as specified.

2. The frames $a$, having the openings $g\ h\ i\ k$ through them, forming pipes with lateral openings, in combination with the corrugated sheets within the frames and secured to them at the edges, the frames and sheets being placed together to form chambers with alternate openings to the respective pipes for the passage of fluids of different temperatures for cooling or heating purposes, substantially as specified.

In testimony that I claim the foregoing as my invention I have signed my name in presence of two subscribing witnesses.

EDUARD THEISEN.

Witnesses:
WILHELM WIESENHÜTTER,
MARTIN KÖRNER.